US012406635B2

(12) United States Patent
Liu

(10) Patent No.: US 12,406,635 B2
(45) Date of Patent: Sep. 2, 2025

(54) SOURCE DRIVER CHIP INCLUDING OR LOGIC AND AND LOGIC AND DISPLAY DEVICE

(71) Applicant: TCL CHINA STAR OPTOELECTRONICS TECHNOLOGY CO., LTD., Shenzhen (CN)

(72) Inventor: Jinfeng Liu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/290,736

(22) PCT Filed: Apr. 16, 2021

(86) PCT No.: PCT/CN2021/087753
§ 371 (c)(1),
(2) Date: Jun. 17, 2024

(87) PCT Pub. No.: WO2022/205519
PCT Pub. Date: Oct. 6, 2022

(65) Prior Publication Data
US 2025/0046266 A1 Feb. 6, 2025

(30) Foreign Application Priority Data
Mar. 29, 2021 (CN) ......................... 202110332835.7

(51) Int. Cl.
*G09G 3/3275* (2016.01)
*G09G 3/36* (2006.01)

(52) U.S. Cl.
CPC ... *G09G 3/3648* (2013.01); *G09G 2310/0286* (2013.01); *G09G 2310/0291* (2013.01); *G09G 2320/0219* (2013.01); *G09G 2370/14* (2013.01)

(58) Field of Classification Search
CPC ................... G09G 3/20; G09G 3/3648; G09G 2310/0286; G09G 2310/0275;
(Continued)

(56) References Cited

U.S. PATENT DOCUMENTS

2005/0035958 A1* 2/2005 Moon .................. G09G 3/3674 345/204
2009/0174646 A1* 7/2009 Lim ..................... G09G 3/3677 345/100
(Continued)

FOREIGN PATENT DOCUMENTS

CN 1609939 A 4/2005
CN 111048028 A 4/2020
(Continued)

OTHER PUBLICATIONS

Chinese Office Action issued in corresponding Chinese Patent Application No. 202110332835.7 dated Jan. 21, 2022, pp. 1-6.
(Continued)

*Primary Examiner* — Sanghyuk Park
(74) *Attorney, Agent, or Firm* — PV IP PC; Wei Te Chung

(57) ABSTRACT

A source driver chip and a display device are disclosed. The source driver chip includes an OR logic arithmetic unit, a clock buffer, a shift register, and an AND logic arithmetic unit. An OR logic operation is performed on a line latch signal and a first output data delay control enabling signal to obtain a second output data delay control enabling signal, and an AND logic operation is performed on an initial line latch sub-signals and the second output data delay control enabling signal, such that electrostatic interference of the line latch signal can be reduced.

20 Claims, 3 Drawing Sheets

(58) Field of Classification Search
CPC .............. G09G 2310/0291; G09G 2320/0219; G09G 2370/14; G09G 2330/00
See application file for complete search history.

(56) References Cited

U.S. PATENT DOCUMENTS

| | | | | |
|---|---|---|---|---|
| 2009/0240997 | A1* | 9/2009 | Hasegawa ........ | G01R 31/31727 714/E11.155 |
| 2017/0063358 | A1 | 3/2017 | Chen | |
| 2018/0203067 | A1* | 7/2018 | Chen ................ | G01R 31/31723 |

FOREIGN PATENT DOCUMENTS

| | | | |
|---|---|---|---|
| CN | 111445829 | A | 7/2020 |
| TW | 479408 | B | 3/2002 |

OTHER PUBLICATIONS

Chinese Office Action issued in corresponding Chinese Patent Application No. 202110332835.7 dated Apr. 11, 2022, pp. 1-7.
International Search Report in International application No. PCT/CN2021/087753, mailed on Jan. 4, 2022.
Written Opinion of the International Searching Authority in International application No. PCT/CN2021/087753, mailed on Jan. 4, 2022.

* cited by examiner

SOURCE DRIVER CHIP INCLUDING OR LOGIC AND AND LOGIC AND DISPLAY DEVICE

FIELD OF INVENTION

The present disclosure relates to the field of display technology, and more particularly, to a source driver chip and a display device.

BACKGROUND OF INVENTION

Electro-static discharge (ESD) is a common near-field electromagnetic hazard source, which is harmful. As a common electronic equipment, a display device has been widely used in many fields, and the anti-ESD capability thereof has attracted more and more attention. Chips and other components in the display device are easily subjected to electrostatic impact interference. For example, when testing the ESD of a source driver chip, abnormal picture occurs due to abnormal operation of the source driver chip, and reboot is required for recovery. When the intensity of the received electrostatic interference reaches class C, the testing result tends to fail eventually. After the test, it is found that the abnormal picture easily occurs in the local area of the display device when the intensity of the electrostatic interference is great.

It should be noted that the above introduction of the background is only for convenience of clear and complete understanding of technical solutions of the present disclosure. Therefore, it cannot be considered that the aforementioned technical solutions are well known to those skilled in the art just because they appear in the background of the present disclosure.

SUMMARY OF INVENTION

Technical Problem

A source driver chip and a display device are disclosed to solve the technical problem that the source driver chip is easily subjected to electrostatic interference.

Solutions to Problems

Technical Solutions

In a first aspect, a source driver chip is disclosed, which includes an OR logic arithmetic unit, a clock buffer, a shift register, and an AND logic arithmetic unit; the OR logic arithmetic unit is configured for generating and outputting a corresponding second output data delay control enabling signal according to a received line latch signal and a first output data delay control enabling signal; the clock buffer is connected to the OR logic arithmetic unit, and is configured for outputting a corresponding second clock signal according to a first clock signal and the second output data delay control enabling signal; the shift register is connected to the clock buffer, and is configured for generating a plurality of initial line latch sub-signals according to the line latch signal and the second clock signal; the AND logic arithmetic unit is connected to the OR logic arithmetic unit and the shift register, and is configured for generating corresponding target line latch sub-signals according to the initial line latch sub-signals and the second output data delay control enabling signal.

In one of embodiments, a phase difference between any adjacent two of the target line latch sub-signals is equivalent.

In one of embodiments, the line latch signal is equivalent to one of the target line latch sub-signals.

In one of embodiments, the second output data delay control enabling signal is a pulse signal; when the second output data delay control enabling signal is at a low potential, the clock buffer stops outputting the second clock signal.

In one of embodiments, when the second output data delay control enabling signal is at a high potential, a driving ability of the second clock signal is greater than a driving ability of the first clock signal.

In one of embodiments, the shift register includes at least two flip flops with parallel output; a trigger terminal of at least one of the flip flops is connected to an output terminal of the clock buffer; an input terminal of at least one of the flip flops is connected to the line latch signal.

In one of embodiments, the AND logic arithmetic unit includes a plurality of AND logic units; an input terminal of each of the AND logic units is connected to an output terminal of one of the flip flops; another input terminal of each of the AND logic units is connected to an output terminal of the OR logic arithmetic unit.

In one of embodiments, the source driver chip is configured for outputting corresponding data signals; a rising edge of the line latch signal is configured for indicating the source driver chip to latch the data signals; a falling edge of the line latch signal is configured for indicating the source driver chip to output the data signals.

In one of embodiments, the source driver chip further includes a clock module; an output terminal of the clock module is connected to an input terminal of the clock buffer.

In a second aspect, a display is disclosed, which includes a timing controller and the source driver chip of any one of the aforementioned embodiments, and the source driver chip is connected to the timing controller.

Beneficial Effect of Invention

Beneficial Effect

The source driver chip and the display device provided by the present disclosure may perform an OR logic operation on the line latch signal and the first output data delay control enabling signal to obtain the second output data delay control enabling signal, and perform an AND logic operation on the initial line latch sub-signals and the second output data delay control enabling signal, such that electrostatic interference of the line latch signal can be reduced or eliminated, and thus the anti-electrostatic interference ability of the source driver chip can further be enhanced.

BRIEF DESCRIPTION OF DRAWINGS

Description of Drawings

Figure 1:
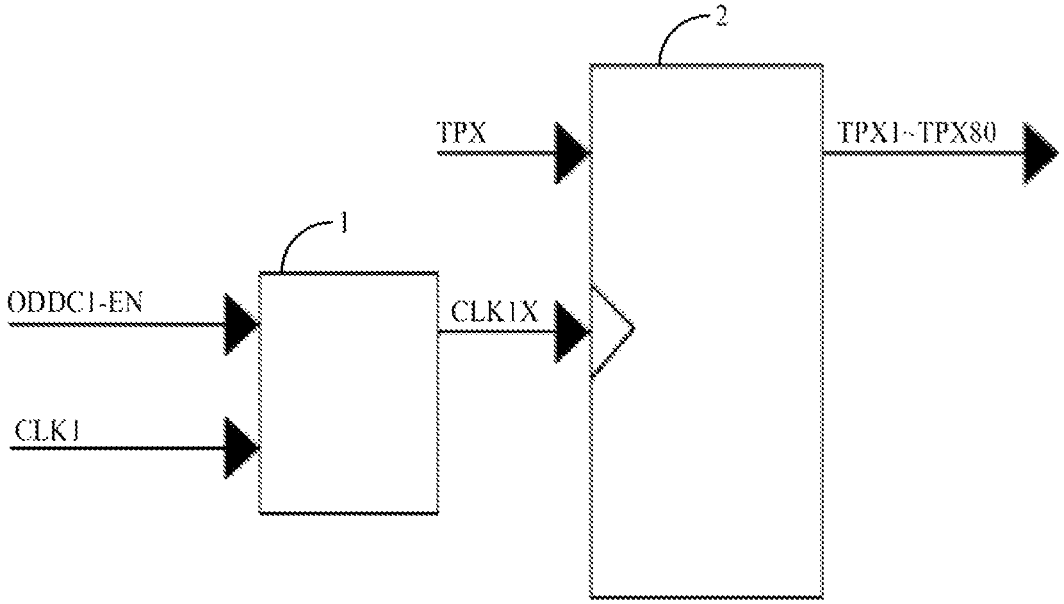

FIG. 1 is a first structural diagram of a source driver chip provided by embodiments of the present disclosure.

Figure 2:
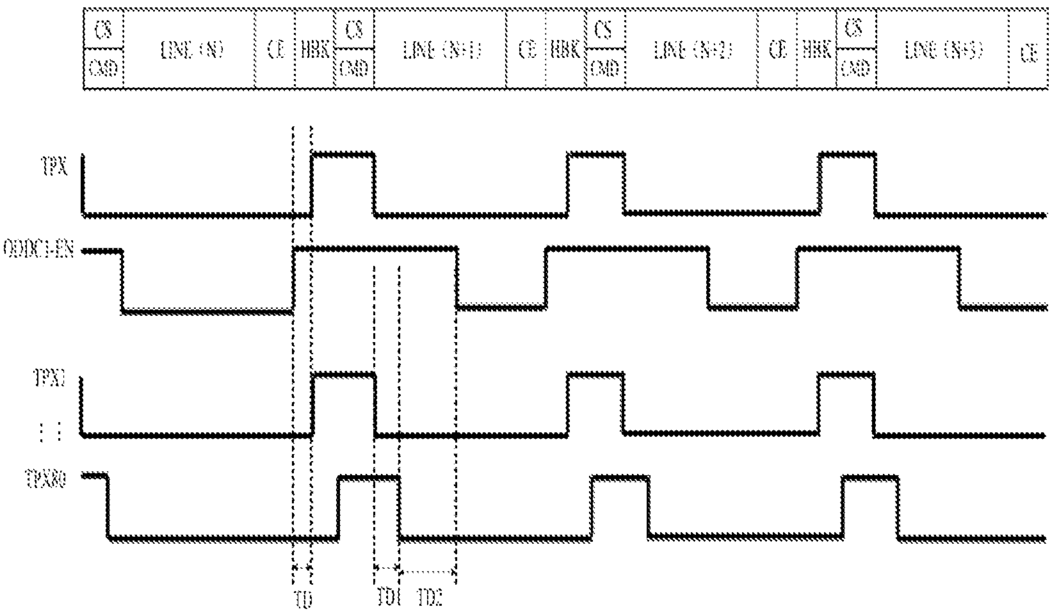

FIG. 2 is a first timing diagram of a source driver chip provided by embodiments of the present disclosure.

Figure 3:
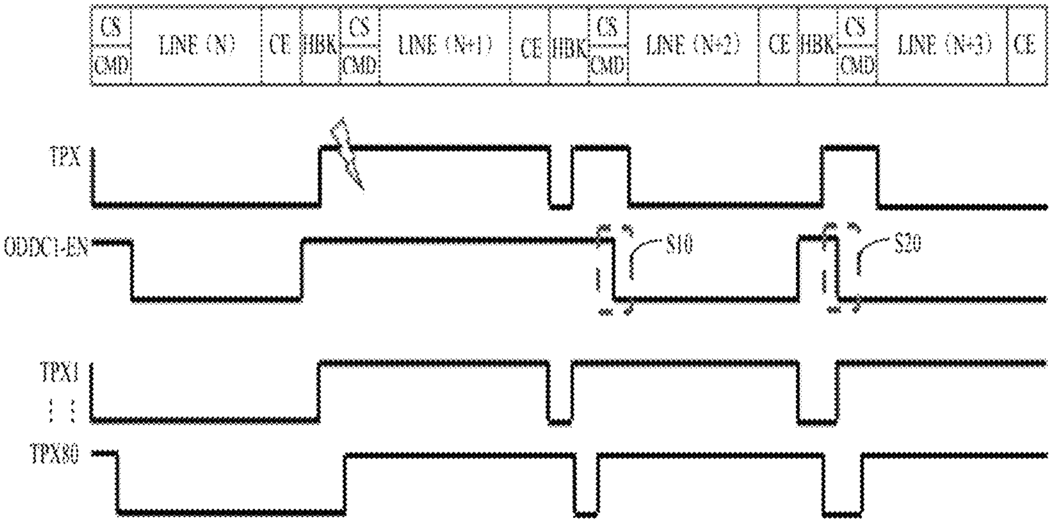

FIG. 3 is a second timing diagram of a source driver chip provided by embodiments of the present disclosure.

Figure 4:
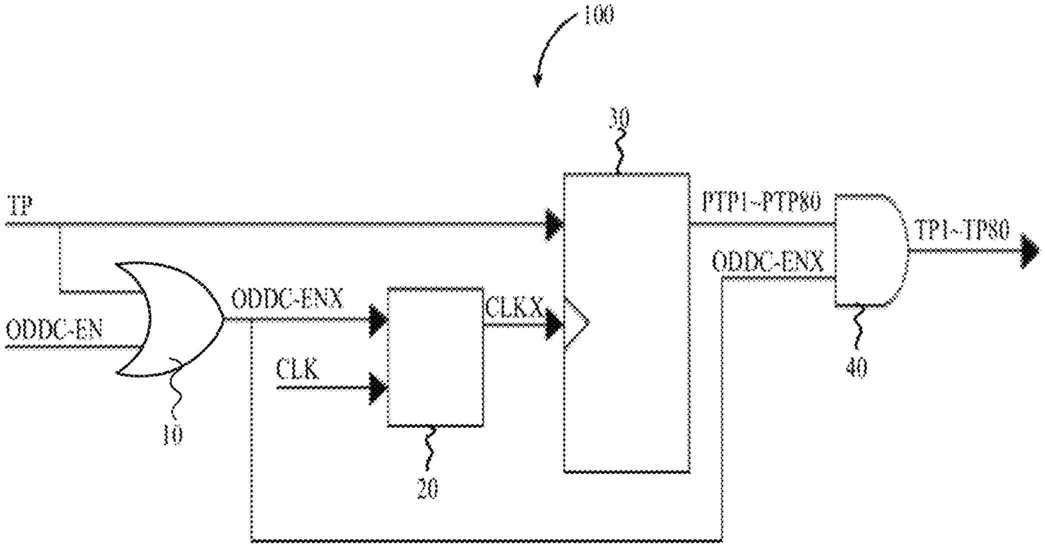

FIG. 4 is a second structural diagram of a source driver chip provided by embodiments of the present disclosure.

Figure 5:
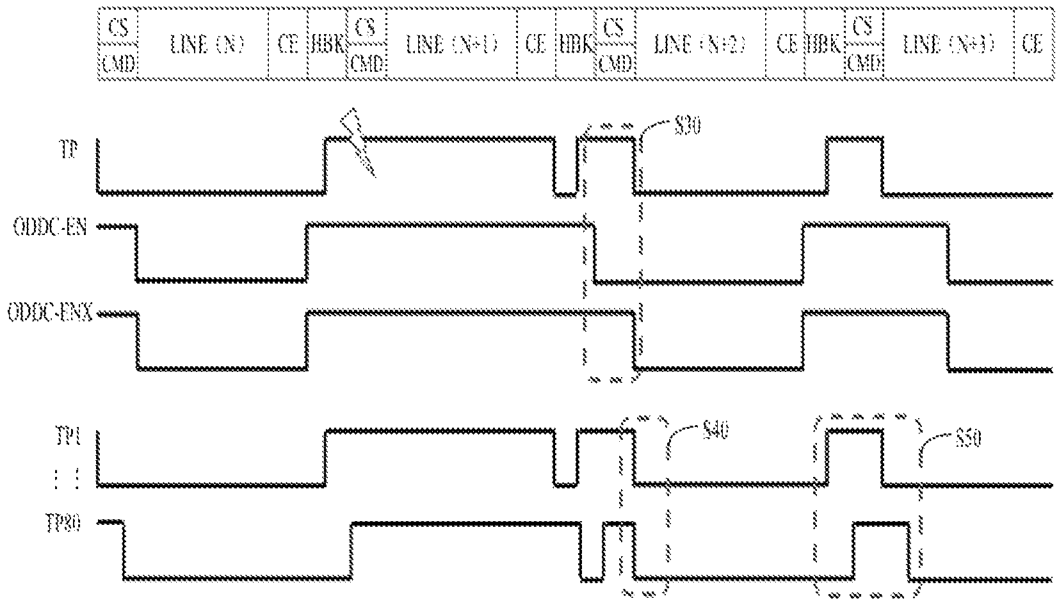

FIG. 5 is a third timing diagram of a source driver chip provided by embodiments of the present disclosure.

Figure 6:
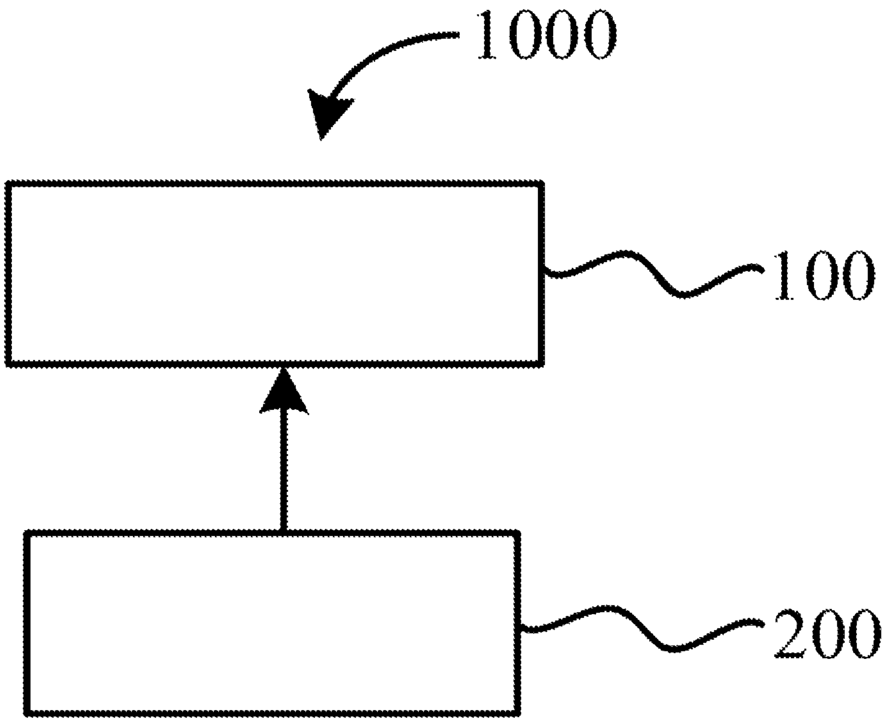

FIG. 6 is a structural diagram of a liquid crystal display device provided by embodiments of the present disclosure.

EMBODIMENTS OF THE INVENTION

Detailed Description of Preferred Embodiments

In order to make the purpose, technical solution and effect of the present disclosure clearer and more definite, the present disclosure is further described in detail with reference to the attached drawings and embodiments. It should be understood that the specific embodiments described herein are only used to explain the present disclosure and the present disclosure is not limited thereto.

As shown in FIG. 1, in one embodiment, the source driver chip may include a clock buffer 1 and a shift register 2; an output terminal of the clock buffer 1 is connected to a trigger input terminal of the shift register 2. A signal input terminal of the shift register 2 is configured to receive a line latch signal TPX. One input terminal of the clock buffer 1 is configured to receive an output data delay control enabling signal ODDC-EN; another input terminal of the clock buffer 1 is configured to receive an initial pulse signal CLK1, and an output terminal of the clock buffer 1 is configured to output a modulated target pulse signal CLK1X. Under the control of the target pulse signal CLK1X, shift register 2 is configured to generate and output multiple line latch sub-signals TPX1-TPX80 with different phase delays according to the line latch signal TPX.

However, when the source driver chip of said structure is subject to strong electrostatic interference, the output voltage of the source driver chip tends to be lower than the voltage of normal display, so as to result in the occurrence of the abnormal picture in the local area of the display device.

Specifically, after persistent research and development, when the picture is abnormal, there is a connection relationship between the line latch signal TPX, the data delay control enabling signal ODDC1-EN and the line latch sub-signals TPX1-TPX80. When the line latch signal TPX is subject to electrostatic interference (electrostatic discharge, ESD), the data delay control enabling signal ODDC1-EN tends to be abnormal.

As shown in FIG. 2, the timing relationship between the data delay control enabling signal ODDC1-EN and the line latch sub-signals TPX1-TPX80 is as follows:

When the source driver chip outputs the pixel data of the $N_{th}$ pixel line LINE(N), firstly, under the control of the command start signal CS in the received signal control command CMD, the source driver chip starts to generate the line latch sub-signals TPX1-TPX80 of the $N_{th}$ pixel line LINE(N) according to the received data delay control enabling signal ODDC1-EN and the line latch signal TPX. Next, the source driver chip terminates the line latch sub-signals TPX1-TPX80 of the $N_{th}$ pixel line LINE(N) according to the command end signal CE in the received signal control command CMD. After a horizontal blanking period HBK, the pixel data of the $(N+1)_{th}$ pixel line LINE(N+1) starts to be outputted. By analogy according to the above process, the pixel data of the $(N+2)_{th}$ pixel line LINE(N+2) and the pixel data of the $(N+3)_{th}$ pixel line LINE(N+3) are outputted in order.

When the data delay control enabling signal ODDC-EN of the $N_{th}$ pixel LINE(N) is at a high potential, the line latch sub-signal TPX1 acts along with the line latch signal TPX, and the line latch sub-signal TPX80 acts after a TD1 period delay on the basis of the line latch sub-signal TPX1. When the line latch sub-signal TPX80 is at a low potential, the data delay control enabling signal ODDC1-EN is pulled down to be at a low potential after a TD2 period delay. After the command end signal CE arrives, the data delay control enabling signal ODDC1-EN is pulled up to be at a high potential, and the line latch signal TPX is pulled up to be at a high potential after a TD period delay, in which TD1 is the delay time of the output data delay control signal. The output data delay control signal (ODDC) is configured to adjust charging rates of different positions, which can improve the display quality. The data delay control enabling signal ODDC1-EN is configured to control the turning-on and turning-off of the output data delay control signal.

In case of no electrostatic interference, for the $N_{th}$ pixel line LINE(N), when the command end signal CE terminates, the data delay control enabling signal ODDC-EN is pulled up to be at a high potential, and the line latch signal TPX is pulled up to be at a high potential after the TD period delay. The period of the line latch signal TPX at a high potential is within the period of the data delay control enabling signal ODDC1-EN at a high potential, and at this time, the line latch sub-signals TPX1-TPX80 normally act along with the line latch signal TPX.

As shown in FIG. 3, when the $(N+1)_{th}$ pixel line LINE (N+1) is subject to electrostatic interference, the period of the line latch signal TPX at a high potential is widened abnormally, such that the periods of the line latch sub-signals TPX1-TPX80 at a high potential are lengthened, which compresses the charging time of the current amplifier. After the TD2 period delay, the data delay control enabling signal ODDC-EN1 is abnormally pulled down to be at a low potential, as shown at S10 and S20 in FIG. 3, such that the data delay control enabling signal ODDC1-EN corresponding to the $(N+2)_{th}$ pixel LINE (N+2) loses.

Before the data delay control enabling signal ODDC1-EN corresponding to the $(N+1)_{th}$ pixel line LINE(N+1) is pulled down to be at a low potential, the line latch signal TPX corresponding to the $(N+2)_{th}$ pixel line LINE(N+2) is pulled up to be at a high potential, such that the line latch sub-signals TPX1-TPX80 corresponding to the $(N+2)_{th}$ pixel line LINE(N+2) are also pulled up to be at a high potential, and the line latch signal TPX corresponding to the $(N+2)_{th}$ pixel line LINE(N+2) is pulled down to be at a low potential. After the data delay control enabling signal ODDC1-EN corresponding to the $(N+1)_{th}$ pixel line LINE(N+1) is pulled down to be at a low potential, the line latch sub-signals TPX1-TPX80 corresponding to the $(N+2)_{th}$ pixel line LINE (N+2) fail to follow the line latch signal TPX corresponding to the $(N+2)_{th}$ pixel line LINE(N+2) to be pulled down to be at a low potential in time.

The data delay control enabling signal ODDC1-EN corresponding to the $(N+3)_{th}$ pixel line LINE(N+3) is pulled up to be at a high potential, such that the line latch sub-signals TPX1-TPX80 corresponding to the $(N+2)_{th}$ pixel line LINE (N+2) are pulled down to be at a low potential in order. At this time, the line latch signal TPX corresponding to the $(N+3)_{th}$ pixel line LINE(N+3) is pulled up to be at a high potential. The data delay control enabling signal ODDC1-EN corresponding to the $(N+3)_{th}$ pixel line LINE(N+3) is pulled down to be at a low potential, and the line latch signal TPX corresponding to the $(N+3)_{th}$ pixel line LINE(N+3) is pulled down to be at a low potential. After the data delay control enabling signal ODDC1-EN corresponding to the $(N+3)_{th}$ pixel line LINE(N+3) is at a low potential, the line latch sub-signals TPX1-TPX80 corresponding to the $(N+3)_{th}$ pixel line LINE(N+3) fail to follow the line latch signal TPX corresponding to the $(N+2)_{th}$ pixel line LINE(N+2) to be pulled down to be at a low potential in time. The charging ability of the current amplifier is insufficient, and the output voltage of the source driver chip cannot reach the normal level, and so on.

Based on the aforementioned analysis, as shown in FIG. 4, the present embodiment provides a source driver chip 100, which includes an OR logic arithmetic unit 10, a clock buffer 20, a shift register 30, and an AND logic arithmetic unit 40. The OR logic arithmetic unit 10 is configured to generate and output a corresponding second output data delay control enabling signal ODDC-ENX according to the received line latch signal TP and a first output data delay control enabling signal ODDC-EN. The clock buffer 20 is connected to the OR logic arithmetic unit 10, and is configured to output a corresponding second clock signal CLKX according to a first clock signal CLK and the second output data delay control enabling signal ODDC-ENX. The shift register 30 is connected to the clock buffer 20, and is configured to generate multiple initial line latch sub-signals PTP1-PTP80 according to the line latch signal TP and the second clock signal CLKX. The AND logic arithmetic unit 40 is connected to the OR logic arithmetic unit 10 and the shift register 30, and is configured to generate corresponding target line latch sub-signals TP1-TP80 according to the initial line latch sub-signals PTP1-PTP80 and the second output data delay control enabling signal ODDC-ENX.

It can be understood that the source driver chip 100 provided by the present disclosure performs an OR logic operation on the line latch signal TP and the first output data delay control enabling signal ODDC-EN to obtain the second output data delay control enabling signal ODDC-ENX, and perform an AND logic operation on the initial line latch sub-signals PTP1-PTP80 and the second output data delay control enabling signal ODDC-ENX, such that electrostatic interference to which the line latch signal TP are subjected can be reduced or eliminated, and thus the anti-electrostatic interference ability of the source driver chip 100 can further be enhanced.

Specifically, as shown in FIG. 4 and FIG. 5, the first output data delay control enabling signal ODDC-EN, which is easily interfered, is no longer directly outputted to the clock buffer 20 (CK Buffer). Instead, by adding the OR logic arithmetic unit 10, the first output data delay control enabling signal ODDC-EN and line latch signal TP are outputted through an OR gate to generate the second output data delay control enabling signal ODDC-ENX, which is then outputted to the clock buffer 20 (CK Buffer).

As shown in FIG. 5, the specific working theorem and the realization mechanism of enhancing anti-ESD capability are as follows:

When the $(N+1)_{th}$ pixel line LINE(N+1) is subjected to electrostatic interference, the period of the line latch signal TP at a high potential is abnormally widened, such that the periods of the target line latch sub-signals TP1-TP80 at a high potential are also lengthened. After the TD2 period delay, the first output data delay control enabling signal ODDC-EN corresponding to the $(N+1)_{th}$ pixel line LINE (N+1) is pulled down to be at a low potential, resulting in the loss of the first output data delay control enabling signal ODDC-EN corresponding to the $(N+2)_{th}$ pixel line LINE (N+2). Before the first output data delay control enabling signal ODDC-EN corresponding to the $(N+1)_{th}$ pixel line LINE(N+1) is pulled down to be at a low potential, the line latch signal TP corresponding to the $(N+2)_{th}$ pixel line LINE(N+2) is pulled up to be at a high potential, so that the second output data delay control enabling signal ODDC-ENX is kept at a high potential, and the initial line latch sub-signals PTP1-PTP80 are pulled up to be at a high potential. When the line latch signal TP corresponding to the $(N+2)_{th}$ pixel line LINE(N+2) is pulled down to be at a low potential, the first output data delay control enabling signal ODDC-EN is already at a low potential, and thus the second output data delay control enabling signal ODDC-ENX is also pulled down to be at a low potential, thereby forcing the target line latch sub-signals TP1-TP80 to be pulled down to be at a low potential.

Before the command end signal CE corresponding to the $(N+2)_{th}$ pixel line LINE(N+2) terminates, the line latch signal TP, the target line latch sub-signals TP1-TP80, and the first output data delay control enabling signal ODDC-EN are all at a low potential, which can ensure that the normal timing can be restored when the $(N+3)_{th}$ pixel line LINE (N+3) starts to output signals.

As shown at S30 in FIG. 5, the first output data delay control enabling signal ODDC-EN corresponding to the $(N+1)_{th}$ pixel line LINE(N+1) is at a low potential. Since the line latch signal TP is at a high potential at this time, the second output data delay control enabling signal ODDC-ENX outputted and calculated by passing through the OR logic arithmetic unit 10 can maintain at a high potential, thereby avoiding the abnormal picture caused by the first output data delay control enabling signal ODDC-EN that is subjected to electrostatic interference.

As shown at S40 in FIG. 5, when the second output data delay control enabling signal ODDC-ENX is at a low potential, the target line latch sub-signals TP1-TP80 can be forced to be pulled down to be at a low potential.

As shown at S50 in FIG. 5, starting from the $(N+3)_{th}$ pixel line LINE(N+3), the target line latch sub-signals TP1-TP80 with different phases can be outputted in normal order.

It can be understood that the anti-ESD ability of the source driver chip 100 can be enhanced and the product reliability is improved in the present embodiment.

In one of the embodiments, the phase difference between any adjacent two of the target line latch sub-signals TP1-TP80 is equivalent.

For example, the phase difference between the target line latch sub-signal TP1 and the target line latch sub-signal TP2 is equivalent to the phase difference between the target line latch sub-signal TP2 and the target line latch sub-signal TP3.

In one of the embodiments, the line latch signal TP is equivalent to one of the target line latch sub-signals TP1-TP80.

For example, the frequency and phase of the line latch signal TP can be equivalent to the frequency and phase of the target line latch sub-signal TP1.

In one of the embodiments, the second output data delay control enabling signal ODDC-ENX is a pulse signal; when the second output data delay control enabling signal ODDC-ENX is at a low potential, the clock buffer 20 stops outputting the second clock signal CLKX.

It should be explained that the clock buffer 20 can determine whether to output the second clock signal CLKX according to the potential of the second output data delay control enabling signal ODDC-ENX.

In one of the embodiments, when the second output data delay control enabling signal ODDC-ENX is at a high potential, the driving ability of the second clock signal CLKX is greater than the driving ability of the first clock signal CLK.

It should be explained that the clock buffer 20 can be configured to enhance the driving ability of the first clock signal CLK. Therefore, the driving ability of the second clock signal CLKX is greater than the driving ability of the first clock signal CLK.

In one embodiment, the shift register 30 includes at least two flip flops with parallel output; a trigger terminal of at least one flip flop is connected to the output terminal of the clock buffer 20; and an input terminal of at least one flip flop is connected to the line latch signal TP.

In one of the embodiments, the AND logic arithmetic unit 40 includes multiple AND logic units; an input terminal of each of the AND logic units is connected to an output terminal of one flip flop; another input terminal of each of the AND logic units is connected to the output terminal of the OR logic arithmetic unit 10.

In one of the embodiments, the source driver chip 100 is configured to output corresponding data signals; the rising edge of the line latch signal TP is configured to indicate the source driver chip 100 to latch the data signals; the falling edge of the line latch signal TP is configured to indicate the source driver chip 100 to output the data signals.

In one of the embodiments, the source driver chip 100 further includes a clock module, and an output terminal of the clock module is connected to the input terminal of the clock buffer 20.

As shown in FIG. 6, in one of the embodiments, the present disclosure provides a display device 1000, which includes a timing controller 200 and the source driver chip 100 in any of the aforementioned embodiments, and the source driver chip 100 is connected to the timing controller 200.

It can be understood that the display device 1000 provided in the present disclosure performs an OR logic operation on the line latch signal TP and the first output data delay control enabling signal ODDC-EN to obtain the second output data delay control enabling signal ODDC-ENX, and performs an AND logic operation on the initial line latch sub-signals PTP1-PTP80 and the second output data delay control enabling signal ODDC-ENX, such that electrostatic interference of the line latch signal TP can be reduced or eliminated and thus the anti-electrostatic interference ability of the source driver chip 100 can further be enhanced.

It should be explained that the display device 1000 receives a low voltage differential (LVDS) signal through the timing controller 200 (TCON) and transmits the corresponding data signal to the source driver chip 100, and outputs an inversion signal (POL) and the line latch signal TP to the source driver chip 100 at the same time. The inversion signal is a pulse signal, which generally changes the level once in the duration of a frame of picture. The source driver chip 100 reverses the polarity of the voltage of its output signal after the change of the level of the inversion signal to prevent the polarization of the liquid crystal. The line latch signal TP is a pulse signal. The source driver chip 100 latches the data signals when the rising edge of the line latch signal TP arrives, and outputs the signal voltages corresponding to the latched data signal to the data lines when the falling edge of the line latch signal TP arrives. Along with the thin film transistors (TFT) which are turned on line by line, the signal voltages are inputted into each pixel line by line to realize the driving of the LCD panel.

It should be explained that the display device in the present disclosure may be, but not limited to, a liquid crystal panel, which includes polarizing films, glass substrates, a black matrix, a color filter, protective films, common electrodes, a calibration layer, a liquid crystal layer (liquid crystal, spacer, sealant), capacitors, display electrodes, a prism layer, and an astigmatism layer.

The polarizing film is also called polarizer. The polarizers may include an upper polarizer and a lower polarizer. The polarization functions of the upper polarizer and the lower polarizer are perpendicular to each other, and the functions thereof are like the fence to block light wave components as requirements. For example, the light wave components perpendicular to the polarizer fence are blocked, and only the light wave components parallel to the fence are allowed to pass.

The glass substrates may include an upper substrate and a lower substrate in the liquid crystal display device, and the main function thereof is to clamp liquid crystal material in the space between the two substrates. Alkali-free borosilicate glass with excellent mechanical properties, heat resistance and chemical corrosion resistance is generally used as the material of the glass substrates. For TFT-LCDs, TFTs are distributed on one glass substrate, and the color filter is deposited on the other glass substrate.

The black matrix is configured to separate the red, green and blue primary colors of the color filter (to prevent color confusion) and prevent light leakage with the help of materials with high shading performance, so as to improve the contrast of each color block. Moreover, in TFT-LCD, the black matrix can also mask the internal electrode routing or thin film transistors.

The color filter, also known as color filter film, is configured to produce red, green and blue light to realize full-color display of LCD.

The alignment layer is also known as alignment film or orientation layer, and the function thereof is to make the liquid crystal molecules to achieve uniform arrangement and orientation on the microscopic level.

The transparent electrodes include common electrodes and pixel electrodes. The input signal voltage is loaded between the common electrodes and pixel electrodes. The transparent electrodes are usually formed by depositing indium tin oxide (ITO) material on the glass substrate to constitute transparent conductive layer.

Liquid crystal material plays a role similar to a light valve in LCD, which can control the brightness of transmitted light so as to achieve the effect of information display.

The driving IC is actually a set of integrated circuit chip device, which is configured to adjust and control the phase, peak value and frequency of the potential signal on the transparent electrodes to establish the driving electric field, and finally realize the information display of liquid crystal.

In the liquid crystal panel, the active matrix liquid crystal display is composed of twisted nematic (TN) liquid crystal material sealed between two glass substrates. The color filter (or color filter film) of red, green and blue (RGB), the black matrix and the common transparent electrode are deposited on the upper glass substrate close to the display screen. The lower glass substrate (the substrate far away from the display screen) is installed with thin film transistor (TFT) device, the transparent pixel electrode, storage capacitors, gate lines, signal lines, etc. The alignment films (or alignment layer) are prepared inside the two glass substrates to make the liquid crystal molecules aligned. The liquid crystal material is poured between the two glass substrates and the spacers are distributed to ensure the uniformity of the gap. With the help of sealant around, the sealing effect is achieved; with the help of silver glue process, the common electrodes of the upper and lower glass substrates are connected.

The outer sides of the upper and lower glass substrates are respectively pasted with polarizers (or polarizing films). When a voltage is applied between the pixel transparent electrode and the common transparent electrode, the arrangement of liquid crystal molecules changes. At this time, the intensity of the incident light through the liquid crystal also changes. Liquid crystal display achieves information display based on the optical rotation of liquid crystal materials with the control of the electric field.

LCD product is a kind of non-active light-emitting electronic device, which does not have luminous characteristics itself and must rely on the emission of the light source in the backlight module to obtain the display performance. Therefore, the brightness of the LCD is determined by the backlight module. Accordingly, the performance of the backlight module directly affects the display quality of the LCD panel.

The backlight module includes a lighting source, a reflector sheet, a light guide plate, diffusers, a brightness enhancement film (prism film) and a frame. The LCD backlight module can be classified into two categories: side lighting backlight module and bottom lighting backlight module. Mobile phones, laptops, and monitors (15 inch) mainly use side lighting backlight, while LCD TVs mostly use bottom lighting backlight. The backlight module mainly uses cold cathode fluorescent lamp (CCFL) and light emitting diode (LED) as the backlight source of the LCD.

The reflector sheet, also known as reflector mask, is mainly configured to fully transmit the light emitted by the light source into the light guide plate to reduce the useless consumption as much as possible.

The main function of the light guide plate is to guide the light from the side light source to the front of the panel.

The prism film, also known as brightness enhancement film, is mainly configured to focus each scattered light through the refraction and total reflection of said film layer on a certain angle and then emit it from the backlight, so as to enhance the display effect of brightness on the screen.

The main function of the diffusers is to modify the side light of the backlight module into uniform front light source, so as to achieve the effect of optical diffusion. The diffusers can include an upper diffuser and a lower diffuser. The upper diffuser is located between the prism film and the liquid crystal components, which is close to the display panel. The lower diffuser is located between the light guide plate and the prism film, which is close to the backlight source.

A LCD is a kind of display made of liquid crystal. Liquid crystals are a kind of organic compound between solid and liquid. At room temperature, they show both liquid fluidity and crystal optical anisotropy. When heated, the liquid crystals become transparent liquid; when cooled, they become crystalline turbid solid.

Under the action of electric field, the arrangement of liquid crystal molecules changes, which affects the intensity of the incident light through the liquid crystal. This change of light intensity is further shown as the change of bright and dark through the action of the polarizer. Therefore, the change of the light intensity can be achieved by controlling the electric field for the liquid crystal, so as to achieve the purpose of information display. Therefore, the role of liquid crystal materials is similar to a small "light valve".

Since there are control circuits and drive circuits around the liquid crystal material, the liquid crystal molecules may be twisted when the electrodes in the LCD generate an electric field, such that the light passing through the liquid crystal molecules are refracted regularly (the optical rotation of the liquid crystal material), and then filtered by the second layer of polarizer to be displayed on the screen.

It is worth noting that the liquid crystal materials do not emit light, and thus the LCD usually needs to be equipped with additional light source for display panel. The main light source system is called "backlight module". The backlight plate is composed of fluorescent materials, which can emit light, and the main function is to provide uniform backlight.

LCD technology is to pour the liquid crystal between two planes with thin slots. The slots on the two planes are perpendicular to each other (intersecting by 90 degrees). In other words, if the molecules in one plane are arranged in the north-south direction, the molecules in the other plane are arranged in the east-west direction, and the molecules between the two planes are forced into a 90-degree torsion state. Since light travels along the alignment of molecules, the light is also twisted 90 degrees as it passes through the liquid crystal. When a voltage is applied to the liquid crystal, the liquid crystal molecules rotate to change the light transmittance, so as to realize multi grayscale display.

LCD usually is composed of two polarizers perpendicular to each other. The polarizer acts like a fence to block the light components as required. For example, the light wave components perpendicular to the fence of the polarizer are blocked, and only the light wave components parallel to the fence are allowed to pass. Natural light radiates randomly in all directions. Two mutually-perpendicular polarizers, under normal circumstances, should block all natural light that attempts to pass therethrough. However, due to the twisted liquid crystal between the two polarizers, the light is twisted 90 degrees by the liquid crystal molecules after passing through the first polarizer, and finally pass through the second polarizer.

For laptop-type or desktop-type LCDs, more complex color display is needed.

For color LCDs, it is also necessary to have a color filter layer specially dealing with color display, i.e., the so-called "color filter", also known as a "color filter film". In the color LCD panel, each pixel is usually composed of three liquid crystal cells, in which each cell has a red, green or blue (RGB) tricolor filter in front of the cell. In this way, the light passing through different cells can show different colors on the screen.

The color filter, the black matrix and the common transparent electrode are generally deposited on the front glass substrate of the display screen. The color LCD can create colorful pictures in high resolution environment.

There is a phenomenon called "visual residue" in the perception of dynamic images by human visual organs (eyes), that is, high-speed moving images may form a short-term impression in the human brain. The "visual residue" principle is applied to the early animations, films, and the latest game programs, which display a series of gradual change of the images in front of people's eyes quickly and continuously to form a dynamic image.

When the speed of multiple images exceeds 24 frames/s, people's eyes feel continuous pictures. That's why movies play at 24 frames per second. If the display speed is lower than this standard, people can obviously feel the pause and discomfort of the picture. According to this index, the display time of each screen should be less than 40 ms. Fast-moving picture displays high definition. The movement speed of a general image is more than 60 frames/s. That is to say, the interval time of each frame of the moving picture is 16.67 ms.

If the response time of the LCD is greater than the interval time of each frame, people may feel that the picture is a little fuzzy when watching the fast-moving image. The response time is a special index of the LCD. The response time of the LCD refers to the response speed of each pixel in the display to the input signal, which is the response time of the LCD from "dark to bright" or from "bright to dark". The smaller this value is, the better the effect is. Fast enough response time can ensure the continuity of the picture. If the response time is too long, the LCD may have trailing shadow while displaying dynamic images. The general response time of the LCD is 2-5 ms.

The so-called TFT refers to the transistor array on the glass substrate of the liquid crystal panel, and each pixel of the LCD has its own semiconductor switch. Each pixel can control the liquid crystal between the two glass substrates by the point pulse, that is, by the active switch to realize independent and accurate control "point-to-point" for each pixel. Therefore, each node of the pixel is relatively independent and can be continuously controlled.

TFT LCD is mainly composed of the glass substrate, gates, drains, sources and semiconductor active layers (a-Si).

The TFT array generally is deposited on the back glass substrate of the display screen (the substrate far away from the display screen) in conjunction with the transparent pixel electrodes, the storage capacitors, the gate lines, and the signal lines. The configuration of such a transistor array can not only improve the reaction speed of the LCD, but also control the grayscale of display, so as to ensure that the image color of the LCD is more realistic and the picture quality is more pleasing to the eyes. Therefore, most LCDs, LCD-TVs and some mobile phones are driven by TFTs. Whether they are small and medium size LCDs using twisted nematic (TN) mode with narrow viewing angle or large size LCD-TVs using in-plane switching (IPS) mode with wide viewing angle, they are commonly known as "TFT-LCDs".

It can be understood that for one of ordinary skill in the art, equivalent replacements or changes can be made according to the technical solutions and the invention concept of the present disclosure, and all these changes or replacements shall fall within the scope of the following claims of the present disclosure.

What is claimed is:

1. A source driver chip, comprising:
- an OR logic arithmetic unit configured for generating and outputting a corresponding second output data delay control enabling signal according to a received line latch signal and a first output data delay control enabling signal;
- a clock buffer connected to the OR logic arithmetic unit and configured for outputting a corresponding second clock signal according to a first clock signal and the second output data delay control enabling signal;
- a shift register connected to the clock buffer and configured for generating a plurality of initial line latch sub-signals according to the line latch signal and the second clock signal; and
- an AND logic arithmetic unit connected to the OR logic arithmetic unit and the shift register and configured for generating corresponding target line latch sub-signals according to the initial line latch sub-signals and the second output data delay control enabling signal.

2. The source driver chip according to claim 1, wherein a phase difference between any adjacent two of the target line latch sub-signals is equivalent.

3. The source driver chip according to claim 2, wherein the line latch signal is equivalent to one of the target line latch sub-signals.

4. The source driver chip according to claim 1, wherein the second output data delay control enabling signal is a pulse signal; when the second output data delay control enabling signal is at a low potential, the clock buffer stops outputting the second clock signal.

5. The source driver chip according to claim 4, wherein when the second output data delay control enabling signal is at a high potential, a driving ability of the second clock signal is greater than a driving ability of the first clock signal.

6. The source driver chip according to claim 1, wherein the shift register comprises at least two flip flops with parallel output; a trigger terminal of at least one of the flip flops is connected to an output terminal of the clock buffer; an input terminal of at least one of the flip flops is connected to the line latch signal.

7. The source driver chip according to claim 6, wherein the AND logic arithmetic unit comprises a plurality of AND logic units; an input terminal of each of the AND logic units is connected to an output terminal of one of the flip flops; another input terminal of each of the AND logic units is connected to an output terminal of the OR logic arithmetic unit.

8. The source driver chip according to claim 1, wherein the source driver chip is configured for outputting corresponding data signals; a rising edge of the line latch signal is configured for indicating the source driver chip to latch the data signals; a falling edge of the line latch signal is configured for indicating the source driver chip to output the data signals.

9. The source driver chip according to claim 1, wherein the source driver chip further comprises a clock module; an output terminal of the clock module is connected to an input terminal of the clock buffer.

10. A display device, comprising:
- a timing controller; and
- the source driver chip according to claim 1 connected to the timing controller.

11. The display device according to claim 10, wherein a phase difference between any adjacent two of the target line latch sub-signals is equivalent.

12. The display device according to claim 11, wherein the line latch signal is equivalent to one of the target line latch sub-signals.

13. The display device according to claim 10, wherein the second output data delay control enabling signal is a pulse signal; when the second output data delay control enabling signal is at a low potential, the clock buffer stops outputting the second clock signal.

14. The display device according to claim 13, wherein when the second output data delay control enabling signal is at a high potential, a driving ability of the second clock signal is greater than a driving ability of the first clock signal.

15. The display device according to claim 10, wherein the shift register comprises at least two flip flops with parallel output; a trigger terminal of at least one of the flip flops is connected to an output terminal of the clock buffer; an input terminal of at least one of the flip flops is connected to the line latch signal.

16. The display device according to claim 15, wherein the AND logic arithmetic unit comprises a plurality of AND logic units; an input terminal of each of the AND logic units is connected to an output terminal of one of the flip flops; another input terminal of each of the AND logic units is connected to an output terminal of the OR logic arithmetic unit.

17. The display device according to claim 10, wherein the source driver chip is configured for outputting corresponding data signals; a rising edge of the line latch signal is configured for indicating the source driver chip to latch the data signals; a falling edge of the line latch signal is configured for indicating the source driver chip to output the data signals.

18. The display device according to claim 10, wherein the source driver chip further comprises a clock module; an output terminal of the clock module is connected to an input terminal of the clock buffer.

19. The display device according to claim 10, wherein the display device is a liquid crystal display device.

20. The display device according to claim 10, wherein at least one of the line latch signal and the target line latch sub-signals is a pulse signal.

* * * * *